US006382463B2

(12) United States Patent
Meshberg

(10) Patent No.: US 6,382,463 B2
(45) Date of Patent: May 7, 2002

(54) SPRAY DISPENSING DEVICE WITH NOZZLE CLOSURE

(75) Inventor: Philip Meshberg, Boynton Beach, FL (US)

(73) Assignee: Dispensing Patents International LLC, Boynton Beach, FL (US)

( * ) Notice: Subject to any disclaimer, the term of this patent is extended or adjusted under 35 U.S.C. 154(b) by 0 days.

(21) Appl. No.: 09/726,489

(22) Filed: Dec. 1, 2000

Related U.S. Application Data

(63) Continuation-in-part of application No. 09/258,945, filed on Mar. 1, 1999, now Pat. No. 6,247,613, which is a continuation-in-part of application No. 08/774,338, filed on Dec. 30, 1996, now Pat. No. 5,875,932, which is a continuation-in-part of application No. 08/419,499, filed on Apr. 10, 1995, now Pat. No. 5,620,113.

(51) Int. Cl.[7] .......................... G01F 11/00; B65D 83/00

(52) U.S. Cl. ................. 222/1; 222/153.11; 222/153.13; 222/321.9; 222/383.1; 222/402.11

(58) Field of Search ................................ 222/1, 153.11, 222/153.13, 153.14, 321.7, 321.9, 383.1, 402.11

(56) References Cited

U.S. PATENT DOCUMENTS 3,904,088 A * 9/1975 Milbourne, Sr. ....... 222/402.11
4,506,805 A 3/1985 Marcon ................. 222/153.13
5,158,211 A 10/1992 Meshberg
5,158,233 A 10/1992 Foster et al. ............. 222/321.7
5,603,434 A 2/1997 Von Schuckmann ... 222/153.14

* cited by examiner

*Primary Examiner*—Joseph A. Kaufman
(74) *Attorney, Agent, or Firm*—Kenyon & Kenyon

(57) ABSTRACT

Nozzle closures which are mounted for pivoting movement from a closed to an open position are used with a spray dispensing device. In the open position, the nozzle closure moves away from the spray nozzle on an actuator and a spray opening in a surrounding wall, allowing fluid to dispensed through the nozzle from a pump or aerosol valve, as the actuator is depressed. In the closed position, the nozzle closure pivots into a position where a first projection enters at least partially into the spray nozzle. The projection acts to seal the spray nozzle against air, thereby preventing drying of any fluid in the nozzle and reducing the chance that the spray nozzle will become clogged. The nozzle closure also includes a second projection which fits into a recess in the actuator and serves to provide resistance against depression of the actuator, thereby providing a locking function for the actuator to prevent accidental discharge from the spray nozzle. The sealing finger completely covers a spray opening in a wall surrounding the actuator.

26 Claims, 9 Drawing Sheets

SPRAY DISPENSING DEVICE WITH NOZZLE CLOSURE

This application is a continuation-in-part of U.S. patent application Ser. No. 09/258,945, filed Mar. 1, 1999, now U.S. Pat. No. 6,247,613, which is a continuation-in-part of U.S. patent application Ser. No. 08/774,338, filed Dec. 30, 1996, now U.S. Pat. No. 5,875,932, issued Mar. 2, 1999, which is a division of U.S. patent application Ser. No. 08/419,499, filed Apr. 10, 1995, now U.S. Pat. No. 5,620, 113, issued Apr. 15, 1997.

BACKGROUND OF THE INVENTION

The present invention relates to a spray dispensing device with a closure for the spray nozzle. In particular, the present invention relates to a closure which includes structure to provide a seal for a dispensing nozzle to prevent air or contaminants from causing clogging, and which also includes separate structure to lock the dispensing actuator when it is not in use.

In my previous applications listed above, embodiments of nozzle closures which are mounted for pivoting movement from a closed to an open position are used with a spray dispensing device. In the open position, the nozzle closure moves away from the spray nozzle on an actuator and a spray opening in a surrounding wall, allowing fluid to dispensed through the nozzle, as the actuator is depressed. In the closed position, the nozzle closure pivots into a position where a projection enters at least partially into the spray nozzle. The projection acts to seal the spray nozzle against air, thereby preventing drying of any fluid in the nozzle and reducing the chance that the spray nozzle will become clogged. The nozzle closure in these embodiments also serves to provide resistance against depression of the actuator, to prevent accidental discharge from the spray nozzle.

Although, these embodiments have proven effective, I have found that, in some cases, the projection does not provide sufficient resistance against accidental discharge, particularly in the case where the source of material for the spray nozzle is an aerosol valve. Thus, there is a need for a better nozzle closure which more positively prevents accidental discharge.

SUMMARY OF INVENTION

In accordance with embodiments of the present invention, a spray dispensing device includes an actuator with a spray nozzle and an opening adjacent the spray nozzle. The actuator dispenses spray through the spray nozzle when the actuator is depressed to operate a pump or an aerosol valve. A wall including the spray opening at least partially surrounds the actuator and the spray nozzle is aligned with the spray opening during dispensing whereby spray exiting the spray nozzle passes through the spray opening. Also included is a nozzle closure, with a first projection and a second projection. The first projection fits into the opening adjacent the spray nozzle thereby sealing the spray nozzle. The nozzle closure has a hinge allowing pivotal movement of the nozzle closure from a closed position, at which the projection fits into the opening in the wall adjacent the spray nozzle and the nozzle closure closes the spray opening, to an open position, where the spray opening is open to permit the spray to pass through the spray opening when the actuator is depressed. The second projection is placed on the closure between the hinge and the first projection and fits in a recess in the actuator, engaging the recess when the nozzle closure is in a closed position and preventing actuation of the actuator when the nozzle closure is closed.

DETAILED DESCRIPTION

Figure 1:
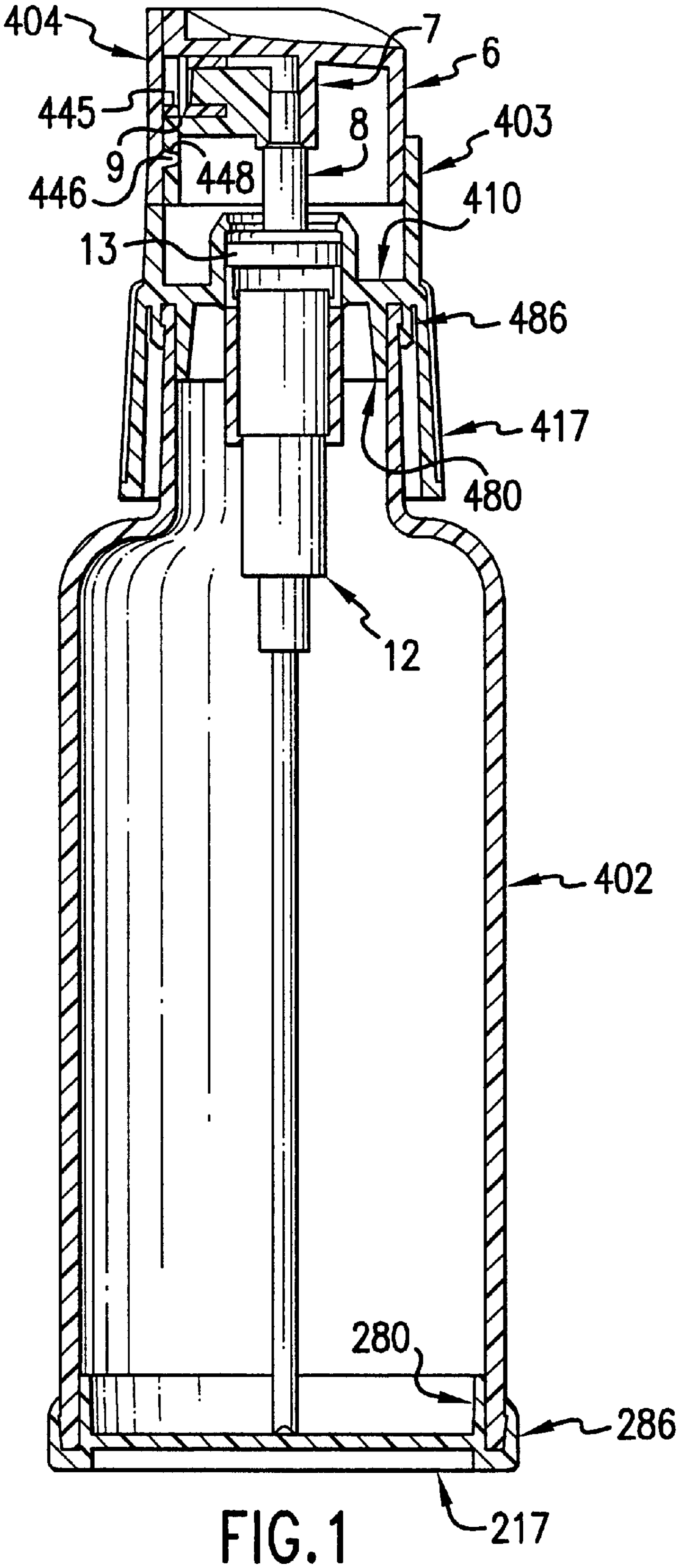
FIG. 1 is a cross-sectional view of an assembled package including a first embodiment of a nozzle closure of the present invention.

FIGS. 1–4 show a container 402 with a mounting cap 417 which includes a first embodiment of the nozzle closure of the present invention. Details of the container 402 and mounting cap are described in U.S. Pat. Nos. 5,875,932 and 5,620,113, the disclosures of which patents are incorporated herein by reference. The mounting cap 417 shown in FIGS. 1–4 is particularly effective in ensuring a leakproof and easy-to-assemble mounting of pump 12 onto container portion 402 without the need for complicated molding of container portion 402. Mounting cap 417 includes an interior piston portion 480, which slides in and seals against an interior sealing surface of container portion 402.

Container portion 402 also includes, at its upper end, an angled snap rim extending around the entire circumference of container portion 402. The snap rim includes a lower snap surface, and mounting cap 417 includes an exterior snap flange 486 which is used to secure and seal mounting cap 417 to container portion 402. The container portion 402 may include a bottom closure 217 with an inner piston portion 200 and an exterior snap flange 286.

Figure 2:
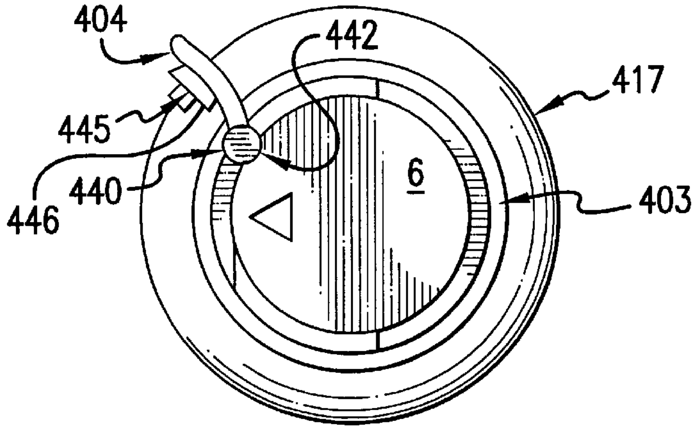
FIG. 2 is a top view of the actuator and mounting cap of the embodiment of FIG. 1.
Figure 3:
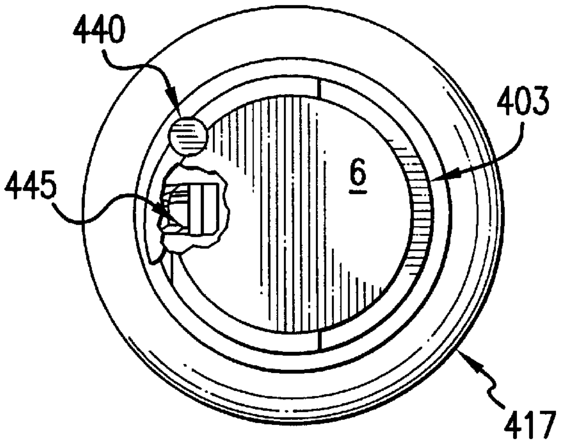
FIG. 3 is a partial cross-section of the view of FIG. 2.
Figure 4:
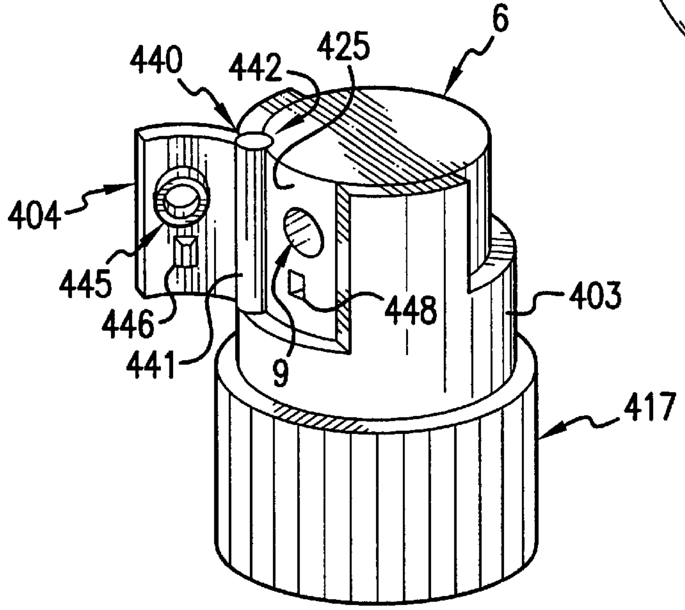
FIG. 4 is a perspective view of the actuator and mounting cap of the embodiment of FIG. 1.
Figure 5:
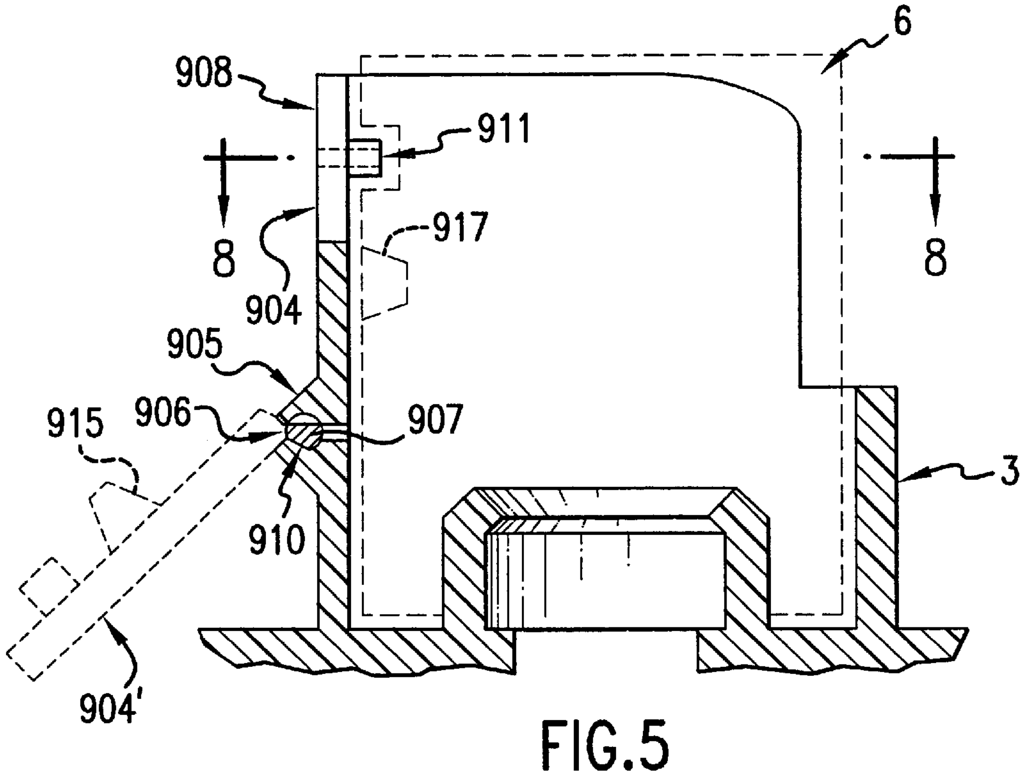
FIG. 5 is a cross-sectional view of the upper end of a container, showing two positions of a second embodiment of a nozzle closure of the present invention.
Figure 6:
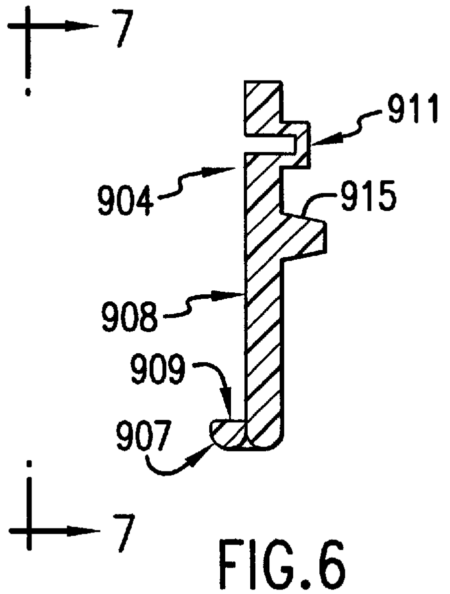
FIG. 6 is a cross-sectional view through line 6—6 of FIG. 7, of the spray nozzle closure of the embodiment of FIG. 5.
Figure 7:
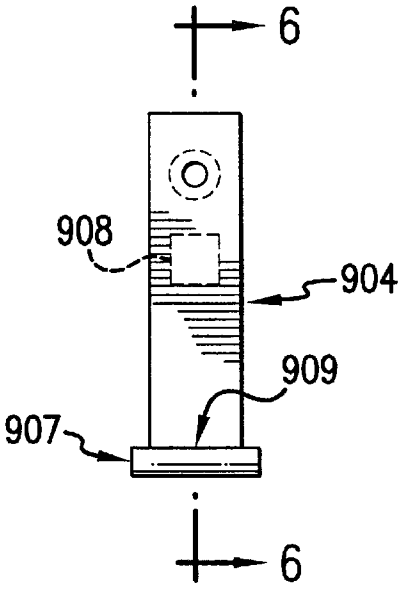
FIG. 7 is a front view of the spray nozzle closure of the embodiment of FIG. 5.
Figure 8:
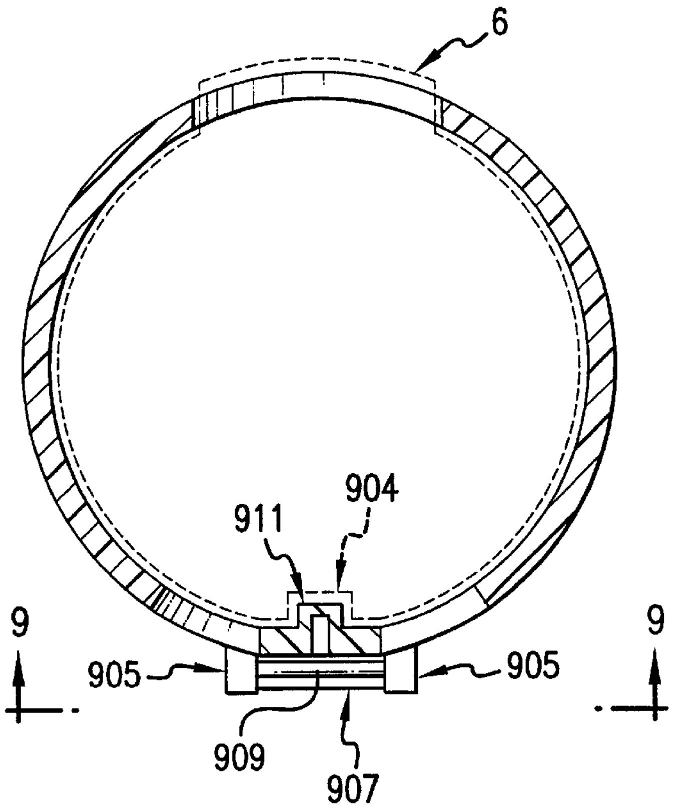
FIG. 8 is a top cross-sectional view through line 8—8 of the spray nozzle closure of the embodiment of FIG. 5.
Figure 9:
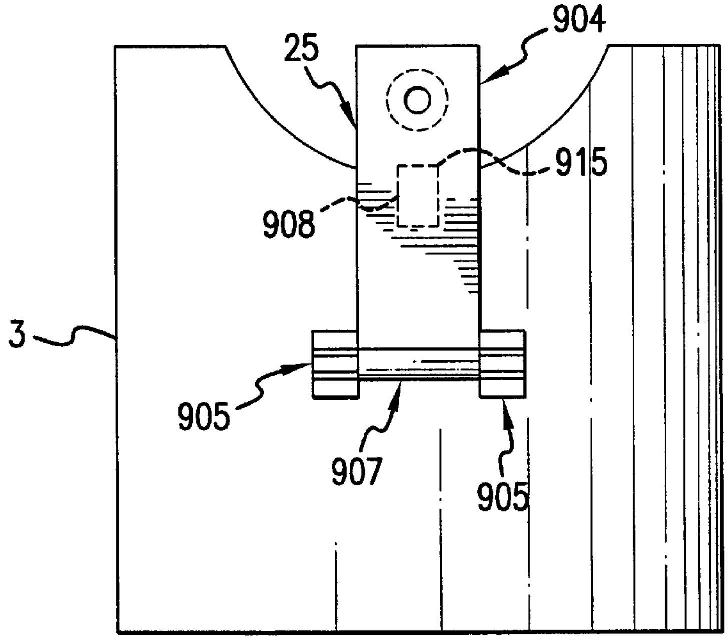
FIG. 9 is a front view of the of the upper end of a container, showing the spray nozzle closure of the embodiment of FIG. 5.

FIGS. 2–4 show the details of the first embodiment of spray nozzle closure for sealing the nozzle 9 on actuator 6. An upstanding wall 403 on mounting cap 417 has mounted thereon, by way of a vertical hinge 440, a sealing finger 404. Hinge 440 can be of any known type, including a molded pin on upstanding wall 403 fitting within a hole in the cylindrical portion 441 of sealing finger 404. Thought the mounting described above, since it is part of the mounting cap 417, wall 403 is mounted to container portion 402. This arrangement allows the sealing finger 404 to be detachably connected to the wall 403, which remains fixed to container portion 402. Cylindrical portion 441 of sealing finger 404 fits within a semi-circular recess 442 in actuator 6. The fit between cylindrical portion 441 and recess 442 ensures that actuator 6 may not be rotated such that spray nozzle 9 is not aligned with spray opening 425 in upstanding wall 403. Sealing finger 404 also includes a tapered projection 446. Actuator 6 has a matching recess 448.

Sealing finger 404, when it is desired to dispense fluid, in the form of spray, from container portion 402, is pivoted away from the spray nozzle 9, to the position shown in FIGS. 2 and 4. Thereafter, the actuator is depressed, and spray exits the spray nozzle 9 through spray opening 425. After dispensing, the sealing finger 404 is pivoted towards spray nozzle 9, so that a projection in the form of an annular sealing rim 445 engages in an opening adjacent the spray nozzle 9. This engagement seals the nozzle 9 from the encroachment of air or other debris into spray nozzle 9, thereby preventing clogging of the nozzle 9 between dispensing strokes. In the closed position, shown in FIG. 3, the sealing finger 404 completely covers spray opening 425. In this closed position the engagement of projection 446 with recess 448 acts to prevent the actuator 6 from being depressed, thereby locking the actuator 6 against accidental discharge. In this embodiment the hinge rotates about an axis parallel to the direction of actuation.

FIGS. 5–9 show the features of a second embodiment of a nozzle closure with a spray orifice sealing device of the present invention. Upstanding wall portion 3 of a mounting cap or integral container has mounted thereon, on opposite sides of the spray opening 25, a bearing in the form of lugs 905. Lugs 905 have a front opening 906 through which the sealing finger 904 lower end may be inserted. Sealing finger 904 includes a hinge 907 mounted on a front surface 908 of sealing finger 904. This arrangement allows the sealing finger 904 to be detachably connected to the wall 3. Hinge 907 includes a flattened surface 909, and other than flattened surface 909, is cylindrical in shape. Lugs 905 define an opening which is cylindrical in shape, except for a flattened section 910. Hinge 907 therefore rotates in the opening in lugs 905, but snap-locks into the position shown as 904 when the flattened surface 909 interacts with flattened section 910. In this embodiment the hinge rotates about an axis perpendicular to the direction of actuation. Sealing finger 904 includes a closure projection 911 which is shaped so as to sealingly fit within the opening surrounding the spray orifice on the actuator. Accordingly, in the position shown as 904 in FIG. 5, the closure portion 911 projects into, and seals, the opening around the spray orifice, preventing air from entering the spray orifice and drying out the liquid in the dispenser. This sealing prevents any potential clogging of the spray orifice. In the position shown as 904' in FIG. 5, the sealing finger 904 is snapped into a position away from the spray orifice, where the sealing finger 904 will not interfere with the spray from the spray orifice. At the same time the engagement of a projection 915 with a recess 917 acts to prevent the actuator 6 from being depressed, thereby locking the actuator 6 against accidental discharge.

Sealing finger 904 is designed so that front surface 908 lies flush with the outer surface of upstanding wall 3. In addition, sealing finger 904 is easily inserted into lugs 905, thereby allowing easy interchangeability of sealing finger 904 onto upstanding wall 3, so that sealing fingers 904 having different colors, different closure portion 911 sizes and shapes, etc., may be placed on upstanding wall 3. Furthermore, sealing finger 904 completely fills the spray opening 25 when closure portion 911 is engaged with the spray orifice opening on the actuator so that dirt, sand, or lint does not clog spray opening 25. As with the embodiment of FIGS. 1–4, the embodiment of FIGS. 5–9, as noted above, also locks the actuator 6 against accidental discharge, upon insertion of projection 915 into recess 917.

Figure 10:
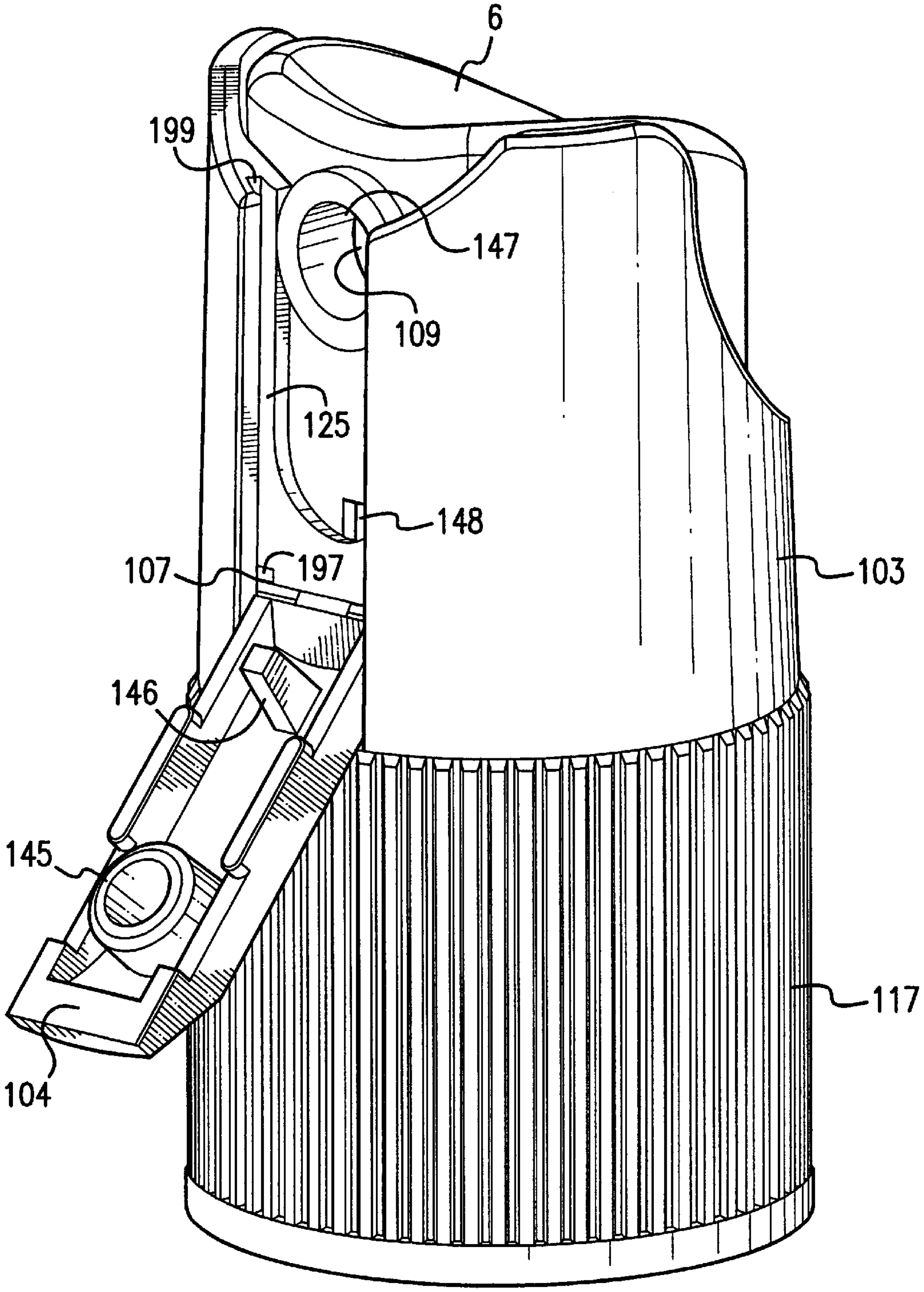
FIG. 10 is a perspective view of a third embodiment of a nozzle closure of the present invention, in an open position.
Figure 11:
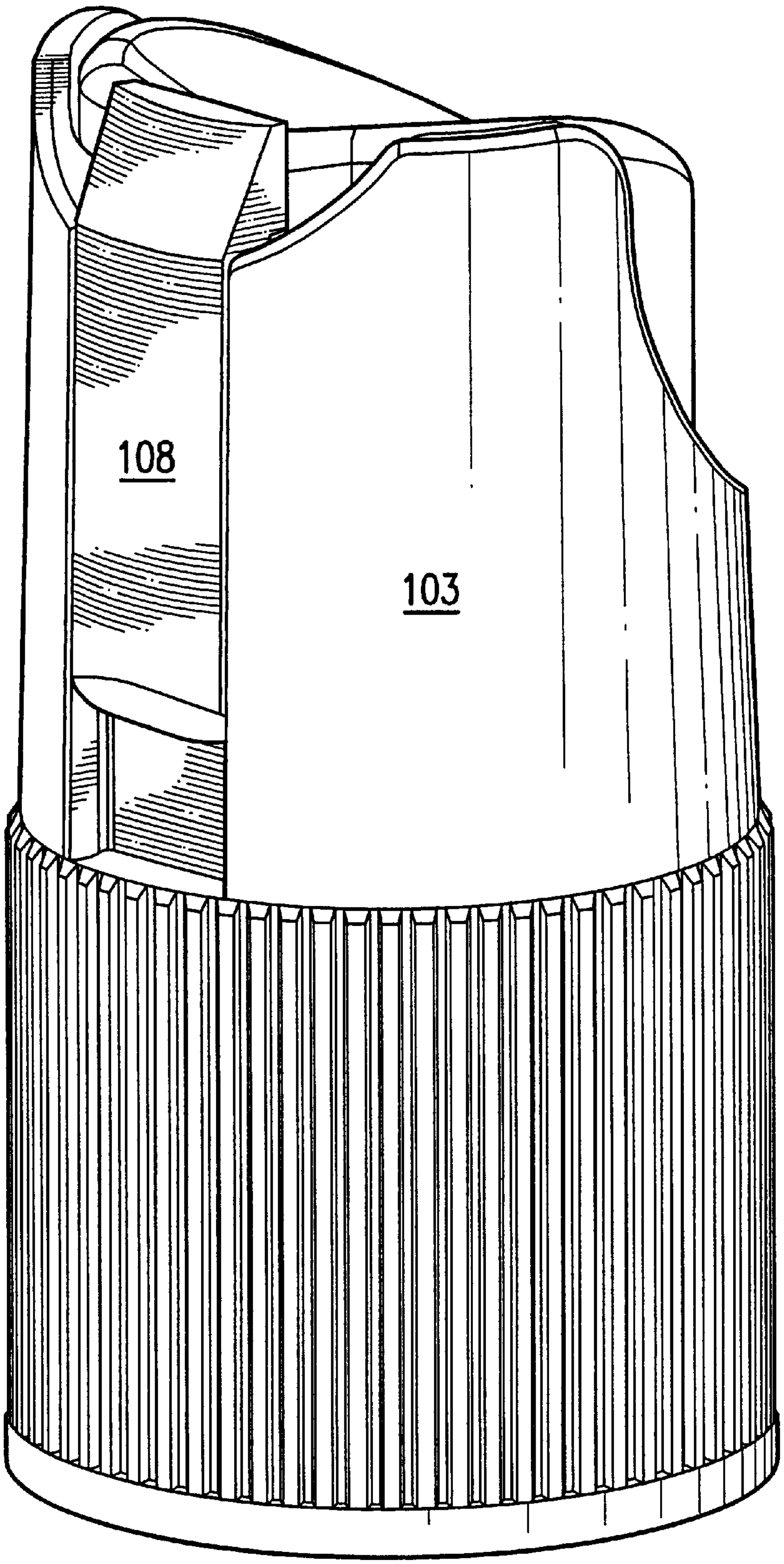
FIG. 11 is a perspective view of the embodiment of FIG. 10, in a closed position.
Figure 12:
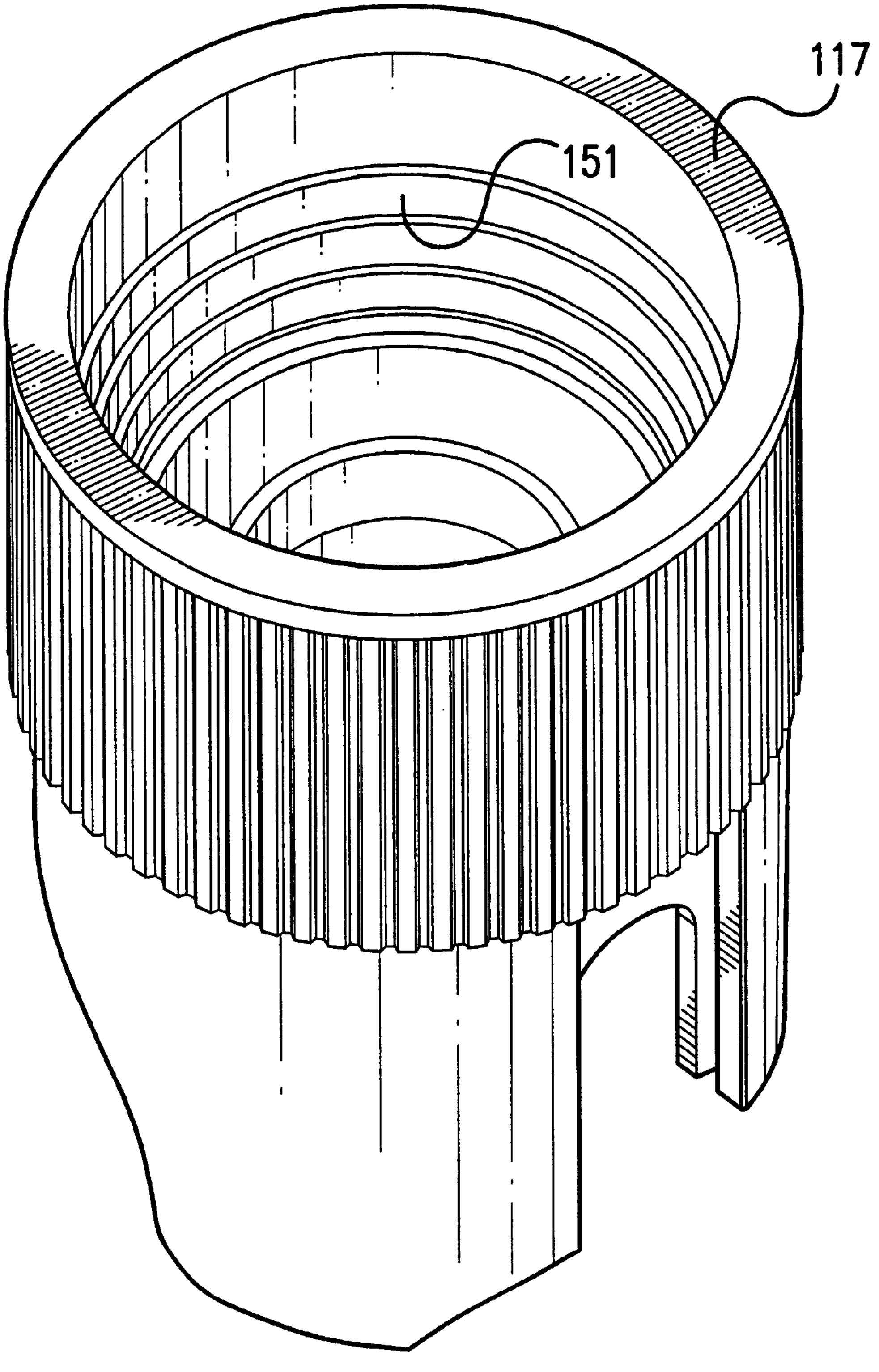
FIG. 12 is a perspective view of the embodiment of FIG. 10, from below showing an internal thread.

FIGS. 10 and 11 are perspective views of a third embodiment which is a variation of the embodiment of FIGS. 5–9. Upstanding wall portion 103 of a mounting cap 117 includes a spray opening 125. This mounting cap 117 may be mounted on a container as shown in FIG. 1. Alternatively, mounting cap 117 may be a screw-on cap as shown in FIG. 12. As illustrated the inside portion of the cap 117 may contain threads 151 for screwing onto a container having a threaded neck.

Sealing finger 104 includes a horizontal hinge 107 disposed at the base of a slots 199 formed in wall portion 103 at opposing sides of opening 125. A bump 197, past which hinge 107 must be pressed prevent the hinge from coming out of the slot once it is pushed into place. Hinge 107 therefore allows sealing finger 104 to rotate relative to wall portion 103 from an open position (FIG. 10) to a closed position (FIG. 11). Sealing finger 104 includes a projection in the form of an annular sealing rim 145 which is shaped so as to sealingly fit within the opening 147 surrounding the spray orifice 109 on the actuator 6. Sealing finger 104 also includes a tapered projection 146 which is shaped so as to tightly fit within an opening 148 on the actuator 6 to positively prevent accidental discharge when the sealing finger 104 is in the closed position.

Accordingly, in the position shown in FIG. 11, the annular sealing rim 145 projects into, and seals, the opening around the spray orifice 109, preventing air from entering the spray orifice 109 and drying out the liquid in the dispenser. This sealing prevents any potential clogging of the spray orifice 109. At the same time, in the position shown in FIG. 10, the sealing finger 104 is moved to a position away from the spray orifice 109, where the sealing finger 104 will not interfere with the spray from the spray orifice and does not block the spray opening 125.

Sealing finger 104 is designed so that front surface 108 lies flush with the outer surface of upstanding wall 103. As a result of the insertion of the hinge of the sealing finger into slots, sealing finger 104 is easily inserted into, and removed from, the mounting cap or cap 117, thereby allowing easy interchangeability of sealing finger 104, so that sealing fingers 104 having different colors, different annular sealing rim 145 sizes and shapes, etc., may be placed on the mounting cap 117. This arrangement allows the sealing finger 104 to be detachably connected to the wall 103. Furthermore, sealing finger 104 completely fills the spray opening 125 when annular sealing rim 145 is engaged with the spray orifice 109 opening on the actuator 6 so that dirt, sand, or lint does not clog spray opening 125.

As noted above, the embodiment of FIGS. 10–12 also includes a feature for positively locking the actuator 6 against accidental discharge. Sealing finger 104 includes a locking projection 146 which fits in a recess 148 of actuator 6 when the sealing finger 104 is in the closed position (FIG. 11). The locking projection 146 in this position therefore prevents the actuator 6 from being depressed downwardly, thereby preventing accidental discharge from the spray orifice 109. In the open positions shown in FIG. 10, the locking projection 146 moves away from the actuator 6, thereby allowing depression of the actuator 6 and spray dispensing through the spray orifice 109.

Figure 13:
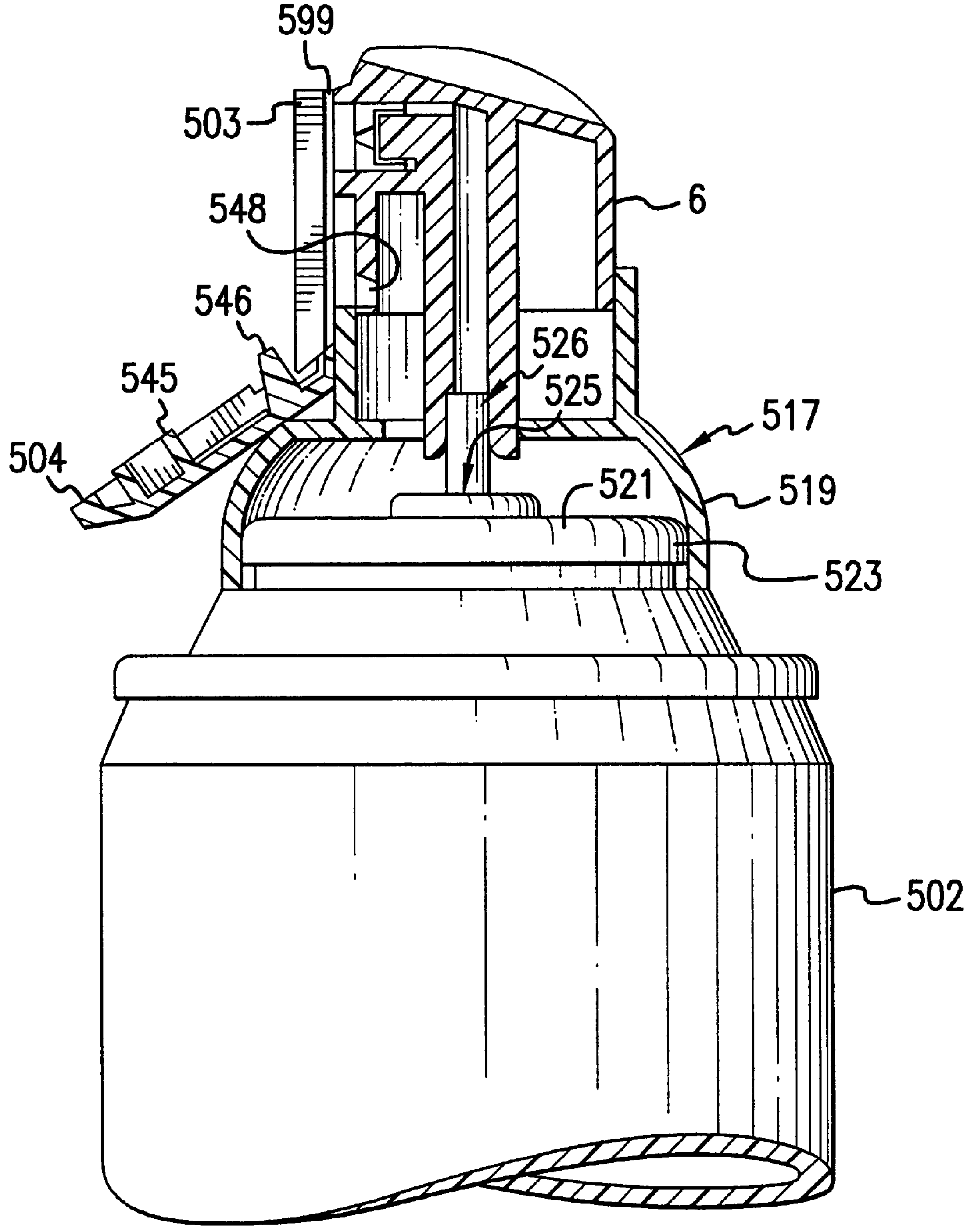
FIG. 13 is a side cross-sectional view of a fourth embodiment of a nozzle closure of the present invention, in an open position.
Figure 14:
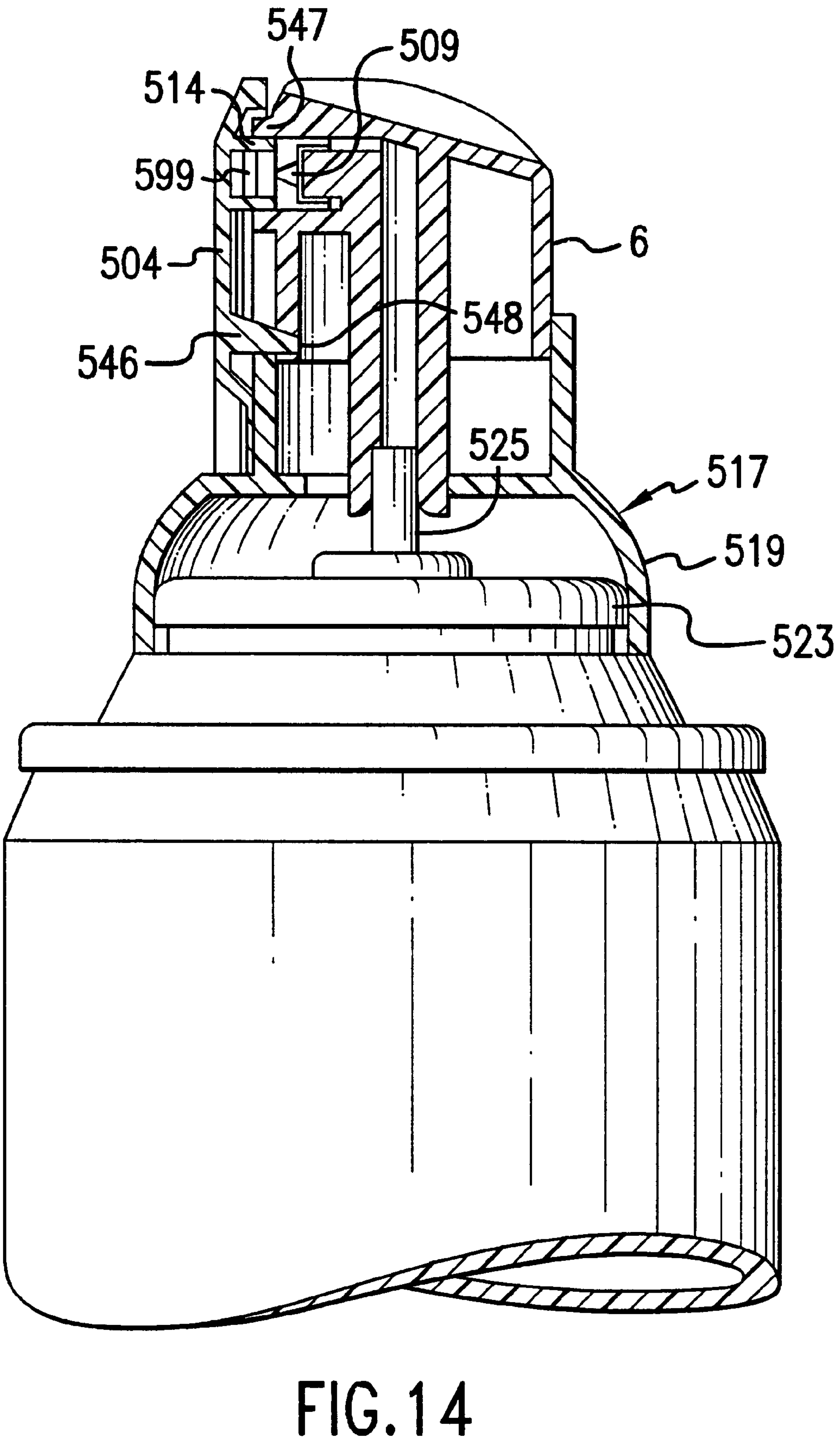
FIG. 14 is a side cross-sectional view of the embodiment of FIG. 13 in a closed position.

The embodiment of FIG. 1 is directed to a pump. However, the actuators with spray nozzles described herein may also be used with aerosol valves. A specific example of an embodiment of the present invention used with an aerosol valve is shown in FIGS. 13 and 14. FIGS. 13 and 14 show an aerosol container 502 with a mounting cap 517 which includes an embodiment of the nozzle closure of the present invention of the general nature shown in FIGS. 10 and 11. The mounting cap 517 shown in FIGS. 13 and 14 includes a cylindrical skirt 519 which engages a beaded rim 523 of a mounting cup 521, at the top of the aerosol container 502, with a press fit attaching mounting cap 517, and with it wall 503, to container 502. Container 502 includes, at its upper end, a beaded rim 523 extending around its entire circumference. In conventional fashion, this is part of mounting cup 521. Mounting cup 521 contains an aerosol valve 525 and has as its purpose mounting the aerosol valve 525 to the top of container 502.

The construction and operation of sealing finger 504 with its sealing rim 545 and its tapered projection 546 is as described in connection with FIGS. 10 and 11. Sealing finger 504 is shown in the open position in FIG. 13 and in the closed position in FIG. 14.

The slots 599 in wall 503 by means of which the hinge of the sealing finger 504 is retained are visible, as is the recess 548 into which projection 546 is inserted when the sealing finger 504 is closed. The manner in which sealing rim 545 fits into the recess 547 surrounding the nozzle is shown in FIG. 14. In this embodiment, with an aerosol valve, accidental actuation is more of a danger and the positive locking effect of projection 546 fitting into matching recess 548 is even more important.

Of course, it will be recognized by those skilled in the art that a variety of variations may be made in the construction of the above invention without departing from the claims. As such, the scope of the above invention is be limited only by the claims appended hereto.

What is claimed is:

1. A spray dispensing device, comprising:

an actuator, the actuator including a spray nozzle and an opening adjacent the spray nozzle, the actuator dispensing spray through the spray nozzle when the actuator is depressed;

a wall at least partially surrounding the actuator, the wall including a spray opening, the spray nozzle being aligned with the spray opening during dispensing whereby spray exiting the spray nozzle passes through the spray opening;

a nozzle closure, the nozzle closure including a first projection, the first projection fitting into the opening adjacent the spray nozzle thereby sealing the spray nozzle, the nozzle closure further including a hinge allowing pivotal movement of the nozzle closure from a closed position, at which the first projection fits into the opening adjacent the spray nozzle and the nozzle closure closes the spray opening, to an open position, where the spray opening is open to permit the spray to pass through the spray opening in the wall when the actuator is depressed;

a second projection on the nozzle closure between the hinge and the first projection; and a recess in the actuator, the second projection engaging the recess when the nozzle closure is in a closed position, the second projection preventing actuation of the actuator when the nozzle closure is closed.

2. The spray dispensing device of claim 1, wherein:

the hinge pivots about an axis parallel to a direction of actuation of the actuator.

3. The spray dispensing device of claim 1, wherein:

the hinge pivots about an axis perpendicular to a direction of actuation of the actuator.

4. The spray dispensing device of claim 3, wherein:

the spray opening is defined by two parallel edges, the edges having formed therein opposed slots, the hinge inserted and retained in the slots.

5. The spray dispensing device of claim 1, wherein:

the actuator is coupled to an aerosol valve.

6. The spray dispensing device of claim 1, wherein:

the first projection is an annular sealing rim.

7. The spray dispensing device of claim 1, wherein the second projection is tapered.

8. A method of dispensing spray, comprising:

providing an actuator including a spray nozzle and an opening adjacent the spray nozzle, surrounding the actuator with a wall including a spray opening with which the spray nozzle is aligned, and a nozzle closure including a first projection;

pivoting the nozzle closure away from the spray nozzle and the spray opening to an open position;

depressing the actuator to thereby dispense spray through the spray nozzle and the spray opening;

pivoting the nozzle closure toward the spray nozzle and spray opening to a closed position so that the projection fits into the opening adjacent the spray nozzle thereby sealing the spray nozzle and the nozzle closure closes the spray opening in the wall;

engaging a second projection on the nozzle closure with a recess in the actuator to prevent accidental discharge when in the closed position.

9. The method of claim 8, wherein the step of pivoting comprises pivoting about an axis parallel to a direction of actuation of the nozzle.

10. The method of claim 8, wherein the step of pivoting comprises pivoting about an axis perpendicular to a direction of actuation of the nozzle.

11. A spray dispensing device, comprising:

an aerosol dispenser including a closed container having an aerosol valve mounted thereon;

an actuator, the actuator including a spray nozzle and an opening adjacent the spray nozzle mounted on the aerosol valve, the actuator operating the aerosol valve and dispensing spray through the spray nozzle when the actuator is depressed;

a wall at least partially surrounding the actuator, the wall including a spray opening, the spray nozzle being aligned with the spray opening during dispensing whereby spray exiting the spray nozzle passes through the spray opening, the wall mounted to the container;

a nozzle closure, the nozzle closure including a first projection, the first projection fitting into the opening adjacent the spray nozzle thereby sealing the spray nozzle, the nozzle closure further including a hinge allowing pivotal movement of the nozzle closure from a closed position, at which the first projection fits into the opening adjacent the spray nozzle and the nozzle closure closes the spray opening, to an open position, where the spray opening is open to permit the spray to pass through the spray opening in the wall when the actuator is depressed;

a second projection on the nozzle closure between the hinge and the first projection; and a recess in the actuator, the second projection engaging the recess when the nozzle closure is in a closed position, the second projection preventing actuation of the actuator when the nozzle closure is closed.

12. The spray dispensing device of claim 11, wherein:

the hinge pivots about an axis parallel to a direction of actuation of the actuator.

13. The spray dispensing device of claim 11, wherein:

the hinge pivots about an axis perpendicular to a direction of actuation of the actuator.

14. The spray dispensing device of claim 13, wherein:

the spray opening is defined by two parallel edges, the edges having formed therein opposed slots, the hinge inserted and retained in the slots.

15. The spray dispensing device of claim 11, wherein:

the first projection is an annular sealing rim.

16. The spray dispensing device of claim 11, wherein the second projection is tapered.

17. The spray dispensing device of claim 11, wherein the wall is part of a mounting cap that is press fit onto the container.

18. The spray dispensing device of claim 17, wherein the aerosol valve is mounted to the closed container with a mounting cup and the mounting cap is press fit onto the mounting cup containing the aerosol valve.

19. A spray dispensing device, comprising:

a pump dispenser including a closed container having a pump with a projecting stem mounted thereon;

an actuator, the actuator including a spray nozzle and an opening adjacent the spray nozzle mounted on the pump stem, the actuator operating the pump and dispensing spray through the spray nozzle when the actuator is depressed;

a wall at least partially surrounding the actuator, the wall including a spray opening, the spray nozzle being aligned with the spray opening during dispensing whereby spray exiting the spray nozzle passes through the spray opening, the wall mounted to the container;

a nozzle closure, the nozzle closure including a first projection, the first projection fitting into the opening adjacent the spray nozzle thereby sealing the spray nozzle, the nozzle closure further including a hinge allowing pivotal movement of the nozzle closure from a closed position, at which the first projection fits into the opening adjacent the spray nozzle and the nozzle closure closes the spray opening, to an open position, where the spray opening is open to permit the spray to pass through the spray opening in the wall when the actuator is depressed;

a second projection on the nozzle closure between the hinge and the first projection; and a recess in the actuator, the second projection engaging the recess when the nozzle closure is in a closed position, the second projection preventing actuation of the actuator when the nozzle closure is closed.

20. The spray dispensing device of claim 19, wherein:

the hinge pivots about an axis parallel to a direction of actuation of the actuator.

21. The spray dispensing device of claim 19, wherein:

the hinge pivots about an axis perpendicular to a direction of actuation of the actuator.

22. The spray dispensing device of claim 21, wherein:

the spray opening is defined by two parallel edges, the edges having formed therein opposed slots, the hinge inserted and retained in the slots.

23. The spray dispensing device of claim 19, wherein:

the first projection is an annular sealing rim.

24. The spray dispensing device of claim 19, wherein the second projection is tapered.

25. The spray dispensing device of claim 19, wherein the wall is part of a mounting cap that is snapped onto the container.

26. The spray dispensing device of claim 19, wherein the wall is part of a mounting cap that is screwed onto a neck of the container.

* * * * *